US006751064B2

United States Patent
Kuwajima et al.

(10) Patent No.: US 6,751,064 B2
(45) Date of Patent: Jun. 15, 2004

(54) HEAD SUPPORTING DEVICE AND DISK DRIVE USING THE SAME

(75) Inventors: Hideki Kuwajima, Kyoto (JP); Kenichi Sakamoto, Osaka (JP); Makoto Miyamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 319 days.

(21) Appl. No.: 10/075,565

(22) Filed: Feb. 13, 2002

(65) Prior Publication Data

US 2002/0126419 A1 Sep. 12, 2002

(30) Foreign Application Priority Data

| Feb. 13, 2001 | (JP) | ........................... 2001-034916 |
| Apr. 3, 2001 | (JP) | ........................... 2001-104108 |
| Jul. 4, 2001 | (JP) | ........................... 2001-203600 |

(51) Int. Cl.$^7$ .............................................. G11B 5/596
(52) U.S. Cl. .................................. 360/244.8; 360/265.9
(58) Field of Search ......................... 360/244.8, 244.2, 360/265.7, 265.9, 246.3

(56) References Cited

U.S. PATENT DOCUMENTS

| 4,208,684 A | * | 6/1980 | Janssen et al. ........... 360/244.8 |
| 4,980,787 A | | 12/1990 | Iwanaga |
| 5,003,420 A | | 3/1991 | Hinlein |
| 5,012,369 A | | 4/1991 | Owe et al. |
| 5,734,525 A | * | 3/1998 | Girard ..................... 360/244.8 |
| 5,751,519 A | | 5/1998 | Hata |
| 5,768,064 A | | 6/1998 | Baasch et al. |
| 5,936,803 A | | 8/1999 | Berding |
| 6,108,171 A | * | 8/2000 | Coon et al. ............... 360/244.2 |
| 6,462,910 B1 | * | 10/2002 | Shimizu et al. .......... 360/244.8 |

FOREIGN PATENT DOCUMENTS

| EP | 0 342 625 A2 | 11/1989 |
| EP | 0 555 969 A1 | 8/1993 |
| JP | 60-160063 | 8/1985 |
| JP | 63-087670 | 4/1988 |
| JP | 01-184768 | 7/1989 |
| JP | 01-292683 | 11/1989 |
| JP | 05-159262 | 6/1993 |
| JP | 05-159496 | 6/1993 |
| JP | 05-303842 | 11/1993 |
| JP | 06-223520 | 8/1994 |
| JP | 07-141812 A | 6/1995 |
| JP | 09-082052 | 3/1997 |
| JP | 10-021659 | 1/1998 |
| JP | 11-039808 | 2/1999 |
| JP | 11-232805 A | 8/1999 |
| JP | 2000-100103 A | 4/2000 |
| JP | 2001-14820 | 1/2001 |
| WO | WO 95/13610 | 5/1995 |

OTHER PUBLICATIONS

European Search Report corresponding to application No. EP 03 01 2631 dated Oct. 2, 2003.
European Search Report dated Aug. 25, 2003 (6 pages).

* cited by examiner

*Primary Examiner*—Robert S. Tupper
(74) *Attorney, Agent, or Firm*—RatnerPrestia

(57) ABSTRACT

A head supporting device comprises a support arm and a head mounted to an underside surface at one end of the support arm. The support arm is disposed in a rotatable manner about a bearing unit in a radial direction of a recording medium as well as a perpendicular direction with respect to a writing surface of the recording medium, and the support arm is provided with resilient means for imposing upon itself with a thrusting force in a direction toward the recording medium. Because of this structure, a portion serving as the support arm can be formed with a material of high rigidity, the thrusting force of the resilient means upon the slider can be set freely as desired, and its resonance frequency can be increased, thereby providing the head supporting device with an extremely high resistance to shock, and high responsivity with capability of making a high speed access.

37 Claims, 13 Drawing Sheets

HEAD SUPPORTING DEVICE AND DISK DRIVE USING THE SAME

FIELD OF THE INVENTION

The present invention relates to a head supporting device for levitating type head, and a disk drive using the same such as a magnetic disk drive, optical disk drive, magneto-optic disk drive, and the like.

BACKGROUND OF THE INVENTION

With reference to the accompanying drawing, described hereinafter pertains to a head supporting device of the prior art employed in a magnetic disk drive such as hard disk drive, as an example of the conventional head supporting device of a disk drive having a levitating type head.

FIG. 11 is a plan view showing a structure of a head supporting device of the prior art for a magnetic disk drive, and a relation between the head supporting device and a magnetic recording medium.

In FIG. 11, head supporting device 108 has such a structure that comprises suspension 102 of a comparatively low rigidity, plate spring 103, and support arm 104 of a comparatively high rigidity, and that the suspension 102 is provided with slider 101 having a magnetic head (not show in the drawing) mounted to an underside surface at one end thereof.

In addition, magnetic recording medium 107 is so disposed that it is spun by spindle motor 109. During writing and reading of the magnetic disk drive, the magnetic head mounted to the slider 101 receives a certain amount of levitation associated with a levitational force due to airflow generated by spinning of the magnetic recording medium and a thrusting force of the plate spring 103 which shifts the slider 101 toward the magnetic recording medium 107.

This structure of the head supporting device 108 is such that it rotates about bearing unit 105 by an interaction of voice coil 106 disposed to the support arm 104 during writing and/or reading, so that the magnetic head mounted to the slider 101 is positioned to a desired track on the magnetic recording medium 107 and performs the writing and/or reading.

The magnetic disk drive shown in FIG. 11 is a kind of magnetic disk drive, which is generally called a "contact start-stop mode" (hereinafter referred to as CSS mode), having a feature that the magnetic head mounted to the slider 101 levitates from the magnetic recording medium 107 during writing and/or reading, although it stays in contact with the magnetic recording medium 107 when the magnetic recording medium 107 is at a standstill.

In such a magnetic disk drive of the CSS mode, an area shown by a reference mark A of the magnetic recording medium 107 in FIG. 11 is the area that is magnetically writable, and another area shown by a reference mark B is the area where the magnetic head is retracted during a stop, which is called a CSS zone. When the magnetic recording medium 107 is to stop spinning, the magnetic head is first moved to the area B while it is kept levitated. When spinning speed of the magnetic recording medium 107 is reduced thereafter, the levitational force decreases as the airflow between the magnetic recording medium 107 and the slider 101 decreases. The magnetic head finally comes in contact with the magnetic recording medium 107, and it stops in that position.

Therefore, the magnetic recording medium 107 in the magnetic disk drive of the CSS mode is so formed that a surface of the area B is rougher than a surface of the area A, so as to prevent a problem that the magnetic head adheres to the magnetic recording medium 107 when coming to a stop, and damages the magnetic recording medium 107 mechanically and/or magnetically when it restarts again.

There are also other methods of the magnetic disk drive, of which one is a "load/unload mode" (hereinafter referred to as L/UL mode).

FIG. 12 shows a general perspective view representing a structure of a magnetic disk drive of the L/UL mode. In FIG. 12, head supporting device 108 has a structure which is generally similar to that of the CSS mode shown in FIG. 11. However, the head supporting device 108 rotates about bearing unit 105, and moves outside of magnetic recording medium 107 when the magnetic disk drive comes to a stop. In this structure, there is provided ramp 110 at an outside of the magnetic recording medium 107, so as to prevent slider 101 and magnetic head from adhering to the magnetic recording medium 107 by letting the slider 101 supported on suspension 102 to ride up on a tapered portion provided on the ramp 110.

Referring now to FIG. 13, the structure and function of the conventional head supporting device will be described in more detail. FIG. 13 is a perspective view showing a main portion of the conventional head supporting device where a magnetic head is mounted.

The magnetic head (not shown in the figure) is mounted to a surface, which confronts magnetic recording medium 112, of the slider 101 disposed to an underside surface at one end of the suspension 102. The other end of the suspension 102 is bent, in a manner to function as plate spring 103, and this plate spring 103 is connected to the support arm 104. In the case of the CSS mode, the structure is such that the slider 101 is in contact with the magnetic recording medium 112 when the magnetic recording medium 112 is not spinning, and the slider 101 is thrust toward the magnetic recording medium 112 by a reactive force of the plate spring 103 against the magnetic recording medium 112.

As a design condition required for a head supporting device of the magnetic disk drive, it is necessary to impress a predetermined amount of load on the slider in a direction of the magnetic recording medium.

The purpose of this is to levitate the slider steadily and to stabilize an output of the magnetic head mounted to the slider even if there is any shock from the outside or a vertical movement of a surface of the magnetic recording medium during writing and/or reading.

Moreover, it is also necessary for the head supporting device to be such a structure that the plate spring has flexibility in order to maintain a steady thrusting force to the slider even when the surface of the magnetic recording medium is caused to make a vertical movement.

On the other hand, the head supporting device is required to have a high rigidity in order to prevent an impediment to trackability of the magnetic head mounted to the slider and to avoid an off-track error due to an undesired vibration mode that can occur in the head supporting device.

Furthermore, it is also necessary to form the head supporting device thin in a direction perpendicular to the surface of the magnetic recording medium in order to achieve miniaturization, or low-profiling to be more specific, of the magnetic disk drive.

However, because the conventional head supporting device has the structure in which the suspension and the support arm are connected with the plate spring, as described above, it is necessary to satisfy some conflicting conditions in order to meet a variety of requirements for the head supporting device.

In other words, it is necessary that the plate spring, to be more specific, has a reactive force large enough to impress upon the slider with a load it requires so that the slider carrying the magnetic head is levitated with stability. For this reason, number of attempts have been made to change an angle of bending (i.e. forming) between the suspension and the plate spring, and a material of the suspension, to adjust its thickness, and so on.

Next, it is also necessary for the head supporting device to have a certain degree of flexibility in order to prevent the load of the slider to the magnetic recording medium from fluctuating due to vertical movement of the magnetic recording medium, a manufacturing deviation in distance between the slider and the magnetic recording medium from one magnetic disk drive to another in the mass-production and the like. For this reason, the conventional head supporting device has been designed in such a way that the plate spring has the flexibility by providing it with cutout opening 111 as shown in FIG. 13, so as to lower rigidity of the plate spring and to reduce its spring constant.

Besides, if the suspension of a thin plate structure is adopted to increase the flexibility of the plate spring, it produces a vibrating mode such as twisting and the like during movement of the head supporting device for its positioning, because a frequency of its principal resonance point, or the resonance frequency becomes low. This causes the head supporting device to take some time to get itself settled (stabilized) from the vibrating mode, thereby placing a limitation on reduction of the access time.

In addition, since the conventional head supporting device has its center of gravity in a position nearer to the magnetic head than the plate spring, there occurs a phenomenon that the slider jumps off the magnetic recording medium, because the slider loses its balance between the levitational force of the airflow generated by spinning of the magnetic recording medium and the thrusting force placed by the head supporting device for shifting the slider toward the magnetic recording medium when a strong impact and the like is impressed upon the magnetic disk drive from the outside. Thus, possibilities exist that the slider hit the magnetic recording medium, and causes a magnetic damage and/or mechanical damage to the magnetic recording medium.

Although the load to be impressed on the slider is determined by forming of the plate spring, it is necessary to change the suspension according to the slider because the load can vary depending on a kind of the slider used.

Moreover, there has been no other means than discarding the suspension if the desired load could not be obtained due to a deviation in forming the plate spring. The reason of this is that a shape of the formed plate spring takes not only a part in simple adjustment of the load but also a greater part in resonance characteristic of the suspension. Therefore, it results in sacrifice of a resonance performance of the suspension when the load adjustment is made afterward.

The problems described above are not unique to the magnetic disk drive, but any other disk drives having levitating type head such as optical disk drives, magneto-optic disk drives, for instance, also have similar problems.

SUMMARY OF THE INVENTION

A head supporting device of the present invention comprises a support arm and a head mounted to an underside surface at one end of the support arm, wherein the support arm is disposed in a manner that it is rotatable about a bearing unit in a radial direction of a recording medium as well as a perpendicular direction with respect to a writing surface of the recording medium, and resilient means is provided for impressing upon the support arm with a thrusting force in a direction to the recording medium.

As a result, there is provided the head supporting device having an extremely high resistance to shock, high responsivity, and capability of making a high speed access, even if a shock is impressed from the outside, since a part constituting the support arm can be formed with the highly rigid material and the thrusting force of the resilient means to the slider can be set freely as desired, and also since the resonance frequency can be increased, because of the structure in which the part having a rigid body and the other part having resiliency can be provided independently with respect to each other.

In addition, the head can be held with a space away from the recording medium when the recording medium is at a standstill because of the structure in which the head supporting device is freely turnable in the perpendicular direction.

Further, the head supporting device of the present invention comprises the support arm and the head mounted to the underside surface at one end of the support arm, wherein the support arm is disposed in a rotatable manner about the bearing unit in the radial direction of the recording medium as well as the perpendicular direction to the writing surface, and resilient means is provided for impressing upon the support arm with a thrusting force in a direction to the recording medium. The head supporting device is also characterized by having a pivot pedestal disposed to the bearing unit so that a pair of bosses on the pivot pedestal abut upon the support arm, and thereby the support arm is disposed in a manner that it is rotatable in the direction perpendicular to the writing surface about points where the bosses of the pivot pedestal abut upon the support arm, as the points serve as a fulcrum.

Since this allows precise setting of a center of the rotation with a simple structure, it realizes positioning control of the head more accurately.

Furthermore, the pair of bosses provided on the pivot pedestal are so arranged that they abut upon the support arm on a phantom line that is perpendicular to both an axial direction of the bearing unit and a longitudinal direction of the support arm, and also traverses the rotational center of the bearing unit in the radial direction of the recording medium. Accordingly, there is provided the head supporting device that is well-balanced in weight along the longitudinal direction of the support arm while also superior in the resistance to shock.

Moreover, the bosses on the pivot pedestal are each arranged in positions that are symmetrical to each other with respect to a centerline along the longitudinal direction of the support arm. This can provide the head supporting device with a good balance in weight along a widthwise direction of the support arm and an outstanding resistance to shock.

Also, the head supporting device of the present invention comprises the support arm and the head mounted to the underside surface at one end of the support arm, wherein the support arm is disposed in a rotatable manner about the bearing unit in the radial direction of the recording medium as well as the perpendicular direction to the writing surface, and resilient means is provided for impressing upon the support arm with a thrusting force in a direction to the recording medium. The head supporting device is further characterized by having fixing means for securing the resilient means to the bearing unit, and adjusting means for adjusting a securing position of the resilient means to the bearing unit with the fixing means and for changing an amount of stress of the resilient means.

This can make the thrusting force of the slider to the magnetic disk medium freely adjustable, thereby making unnecessary an alteration of the head support mechanism even when a change is made in loading specification of the slider.

Further, the adjusting means comprises a spacer placed between the resilient means and the bearing unit. This can provide the head supporting device having the thrusting force adjustable with a simple structure.

Also, the resilient means can comprise a plate spring placed between the bearing unit and the support arm in the head supporting device of this invention. This can readily provide the head supporting device with a low profile structure in a direction perpendicular to the recording medium.

Furthermore, in the head supporting device of this invention, the head is retained by the slider mounted to the support arm, thereby realizing more precise levitation of the head by the design of an air streaming surface of the slider.

Moreover, a gimbals mechanism is disposed to the support arm for supporting the slider freely in a rolling direction as well as a pitching direction. The structure allows the gimbals mechanism to absorb an undesired tilt of the slider with respect to the recording medium in the rolling and the pitching directions during the operating.

In the head supporting device of this invention, a center of gravity of a portion held by the resilient means is in alignment with a point of intersection of a rotational axis of the support arm in the radial direction of the recording medium and another rotational axis in the direction perpendicular to the writing surface of the recording medium, so as to reduce undesired vibrations of the support arm to a minimum level possible even when there are any shocks and the like from the outside.

Next, a disk drive of this invention comprises a recording medium, a spinning means for spinning the recording medium, a support arm provided with a slider carrying a head on it, the slider mounted to one end of the support arm on a surface confronting a writing surface of the recording medium, the support arm being rotatable about a bearing unit in both a direction along the writing surface of the recording medium and another direction perpendicular to the writing surface, resilient means for providing the support arm with a thrusting force in a direction toward the recording medium, and driving means for rotating the support arm in the radial direction of the recording medium.

According to the structure as described above, a part constituting the support arm can be formed with a highly rigid material even if a shock is impressed from the outside, and the thrusting force of the resilient means to the slider can be set freely as desired. As a result, there can be provided the disk drive having an extremely high resistance to shock, as well as high responsivity and capability of making a high speed access since the resonance frequency can also be increased.

Furthermore, the disk drive of this invention comprises the recording medium, the spinning means for spinning the recording medium, the support arm provided with the slider carrying the head on it, the slider mounted to the one end of the support arm on the surface confronting the writing surface of the recording medium, the support arm being rotatable about the bearing unit in both the direction along the writing surface of the recording medium and the direction perpendicular to the writing surface, the resilient means for providing the support arm with the thrusting force in the direction toward the recording medium, and the driving means for rotating the support arm in the radial direction of the recording medium. In addition, the disk drive is characterized by further comprising a pivot pedestal having a pair of bosses and disposed to the bearing unit in a manner that they abut upon the support arm, wherein the support arm is disposed in a turnable manner in the direction perpendicular to the writing surface about points where the bosses of the pivot pedestal abut upon the support arm with the points serving as a fulcrum.

Accordingly, the structure as described makes possible precise setting of a center of the rotation with the simple structure, and thereby positioning control of the head can be realized more accurately.

Moreover, the pair of bosses provided on the pivot pedestal are so arranged that they abut against the support arm on a phantom line that is perpendicular to both an axial direction of the bearing unit and a longitudinal direction of the support arm, and also traverses a rotational center of the bearing unit in the radial direction of recording medium. Accordingly, there is provided the disk drive that is well-balanced in weight along the longitudinal direction of the support arm while also superior in the resistance to shock.

Also, the bosses on the pivot pedestal are each arranged in positions that are symmetrical to each other with respect to a centerline along the longitudinal direction of the support arm. This can provide the disk drive with a good balance in weight in a widthwise direction of the support arm and also an excellent resistance to shock.

Furthermore, the disk drive of this invention comprises the recording medium, the spinning means for spinning the recording medium, the support arm provided with the slider carrying the head on it, the slider mounted to the one end of the support arm on the surface confronting the writing surface of the recording medium, the support arm being rotatable about the bearing unit in both the direction along the writing surface of the recording medium and the direction perpendicular to the writing surface, the resilient means for providing the support arm with the thrusting force in the direction toward the recording medium, and the driving means for rotating the support arm in the radial direction of the recording medium. In addition, the disk drive is characterized by further comprising fixing means for securing the resilient means to the bearing unit, and adjusting means for adjusting a securing position of the resilient means to the bearing unit with the fixing means and for changing an amount of stress of the resilient means.

With this structure, the thrusting force of the slider to the recording medium is made freely adjustable, thereby making unnecessary an alteration of the head support mechanism even when a change is made in a loading specification of the slider.

In addition, the adjusting means comprises a spacer placed between the resilient means and the bearing unit. This can provide a disk drive having the thrusting force adjustable with a simple structure.

Furthermore, the disk drive of this invention comprises the recording medium, the spinning means for spinning the recording medium, the support arm provided with the slider carrying the head on it, the slider mounted to the one end of the support arm on the surface confronting the writing surface of the recording medium, the support arm being rotatable about the bearing unit in both the direction along the writing surface of the recording medium and the direction perpendicular to the writing surface, the resilient means for providing the support arm with the thrusting force in the direction toward the recording medium, and the driving means for rotating the support arm in the radial direction of the recording medium. The disk drive is characterized by further comprising depressing means for decreasing the thrusting force impressed upon the support arm by the resilient means when the support arm is turned to the radial direction of the recording medium and retracted to a predetermined area on the writing surface of the recording medium while the head is maintained in contact with the writing surface.

With this structure, in which the depressing means having a small spring constant comes in contact with and thrusts the other end of the support arm while the support arm is being turned in the radial direction of the recording medium, the head or the slider can be prevented from adhering to the recording medium. There is thus provided the disk drive which is small in size and thickness, high resistance to shock, excellent in portability, and capable of making a high speed access, with a simple structure while also achieving as much as possible a reduction of the load imposed during a start on a spindle motor serving the spinning means for the recording medium.

Further, the depressing means is characterized by being a plate spring disposed to the other end of the support arm for depressing the other end of the support arm when the head is being retracted, thereby realizing the structure capable of preventing the head or the slider from adhering to the recording medium with this simple structure and without using a separate driving source and the like.

In addition, the depressing means is so constructed that it decreases the thrusting force to an extent equal to or slightly smaller than that impressed upon the support arm, so as to realize the structure with the highest possible effect of preventing the head or the slider from adhering to the recording medium.

In the disk drive of this invention, the driving means comprises a voice coil disposed to the support arm, and use of its function enables the support arm to make even faster rotational movement.

Also, the resilient means comprises a plate spring placed between the bearing unit and the support arm in the disk drive of this invention. This can readily provide the disk drive with a thin structure in a direction perpendicular to the recording medium.

Furthermore, in the disk drive of this invention, a gimbals mechanism is disposed to the support arm for supporting the slider freely in a rolling direction as well as a pitching direction. This allows the gimbals mechanism to absorb an unwanted tilt of the slider in the rolling and the pitching directions with respect to the recording medium during writing and reading operations of a write/read device.

Moreover, in the disk drive of this invention, a center of gravity of a portion held by the resilient means is generally in alignment with a point of intersection between a rotational axis of the support arm in the radial direction of the recording medium and a rotational axis of the recording medium in the direction perpendicular to the writing surface of the recording medium. This can reduce undesired vibrations of the support arm to a minimum level possible even when there are any shocks and the like from the outside.

DESCRIPTION OF THE PREFERRED EMBODIMENTS

First Exemplary Embodiment

As a first exemplary embodiment, an operating principle of a head supporting device of the present invention will be described first, using a magnetic disk drive as an example.

Figure 1:
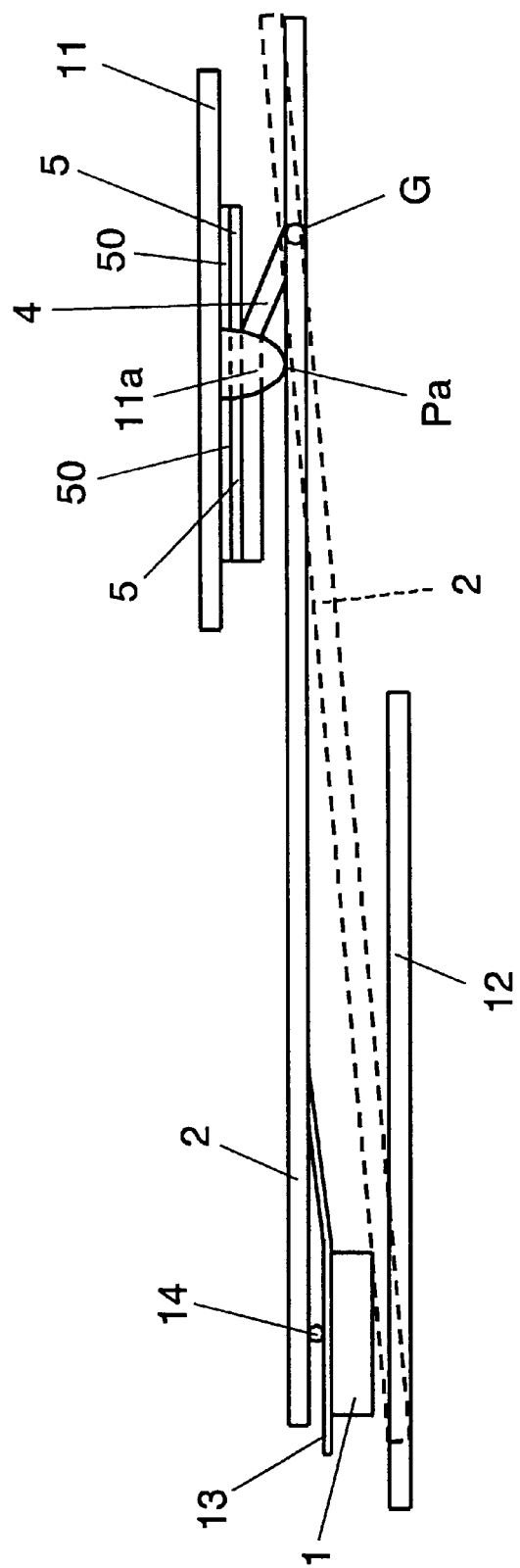
FIG. 1 is a side view of a head supporting device according to a first exemplary embodiment of the present invention, illustratively showing a principle of operation.
Figure 2:
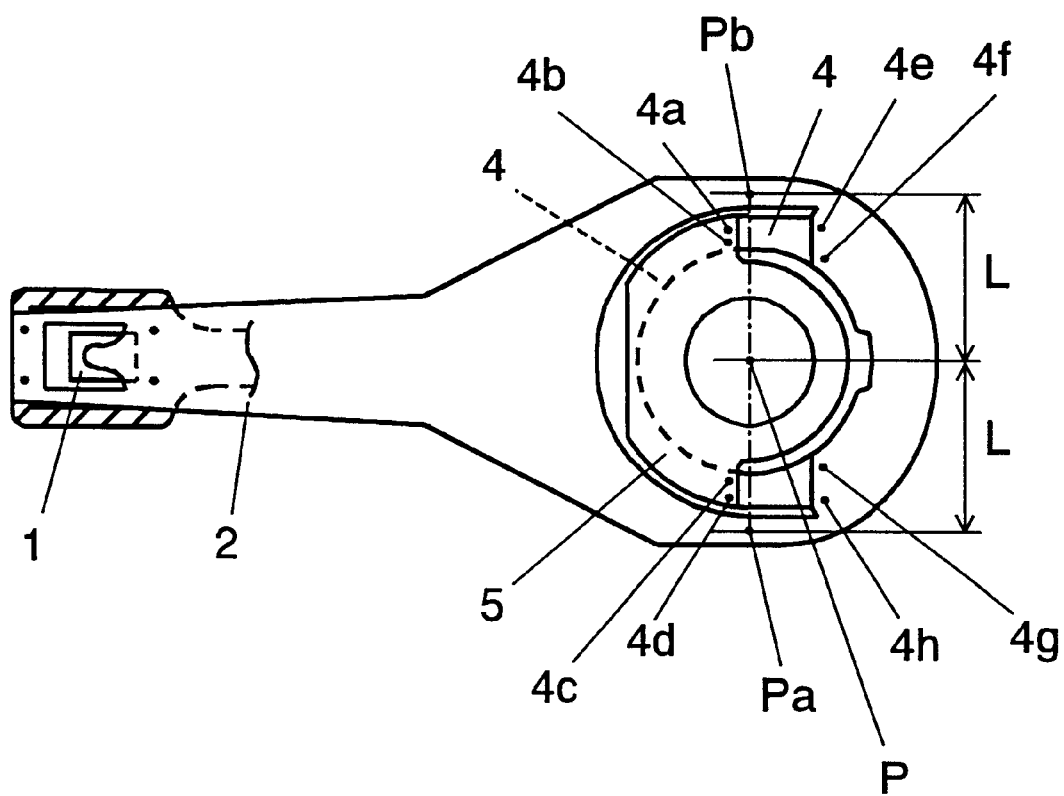
FIG. 2 is a plan view of the head supporting device according to the first exemplary embodiment of the invention, also showing the principle of operation.
Figure 3:
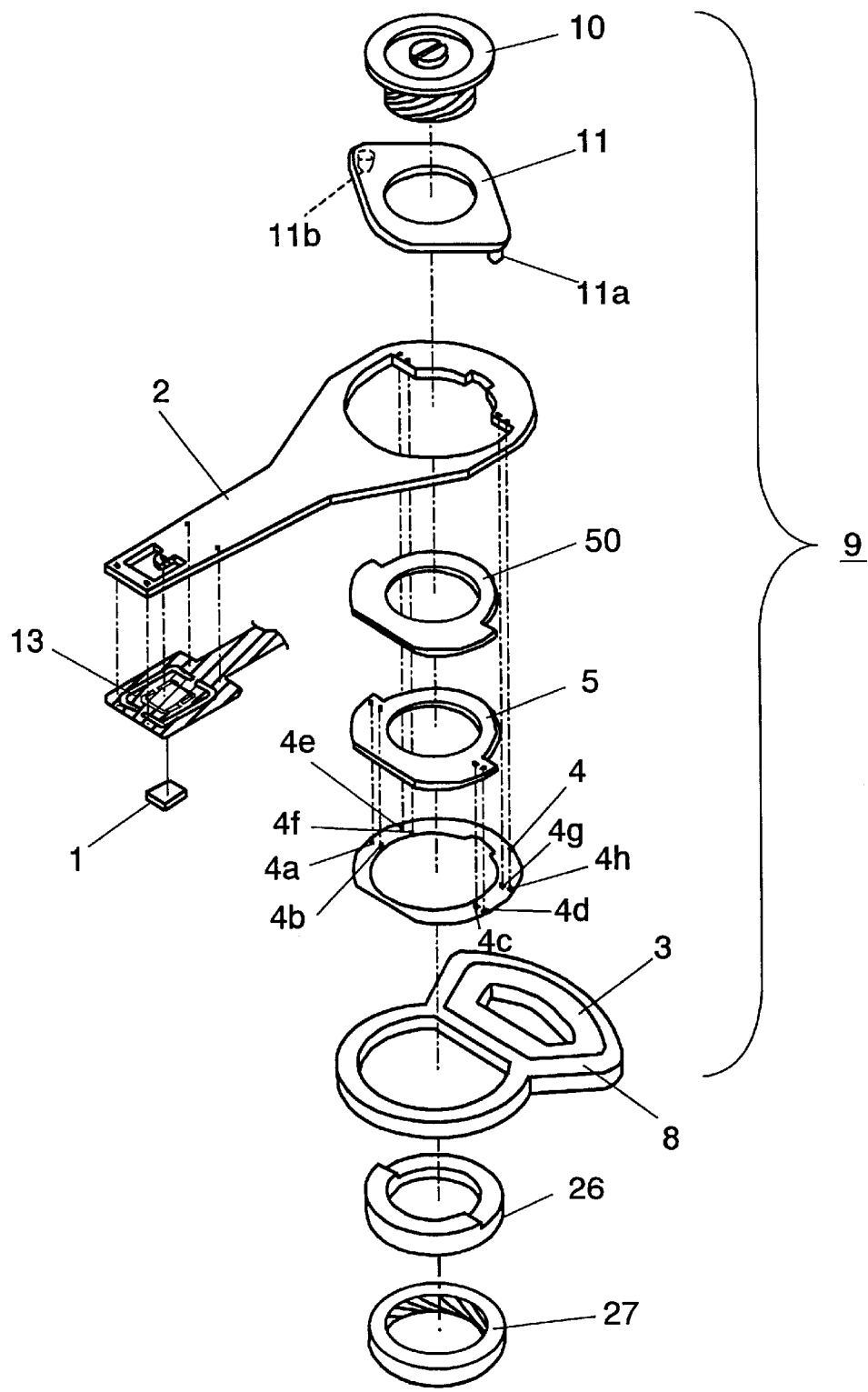
FIG. 3 is a perspective view depicting a structure of a head supporting device according to the second exemplary embodiment of the invention.

FIG. 1 is a side view depicting a general structure of a head supporting device, for the purpose of showing the operating principle of the head supporting device of this invention, FIG. 2 is a plan view, and FIG. 3 is an exploded structural illustration of the same.

In FIG. 1 and FIG. 2, slider 1 provided with a magnetic head (not show in the figures) on an underside surface thereof is mounted to an underside surface at one end of support arm 2, which is then fixed at the other end to one end portion of plate spring 4, as shown in the figures. The other end portion of the plate spring 4 is fixed to spring fixation member 5, which in turn is fixed to pivot pedestal 11 through spacer 50.

Accordingly, the support arm 2 is now in a configuration that it is flexibly secured to the pivot pedestal 11 with the plate spring 4 therebetween.

In addition, the pivot pedestal 11 is provided with a pair of bosses 11a and 11b, and their tips are in abutment upon the support arm 2 at respective contacting points Pa and Pb shown in FIG. 2, in a manner that one end of the support arm 2 is thrust in a direction toward a magnetic recording medium by a resilient force of the plate spring 4. Under this configuration, a compressive stress occurs at each of the contacting points Pa and Pb. They are so constructed that, in an absence of the magnetic recording medium 12, the support arm 2 shifts to a position shown by a dotted line in FIG. 1 due to deformation of the plate spring 4.

The bosses 11a and 11b are so arranged respectively on the pivot pedestal 11 that they abut against the support arm 2 along a line in phantom that is perpendicular to both a direction of a central axis of rotation, about which the support arm 2 rotates along a radial direction of the magnetic recording medium 12, and a longitudinal direction of the support arm 2, and also traverses the central axis of rotation.

During operation of the magnetic disk drive, the support arm 2 takes a configuration shown by a solid line in FIG. 1 due to presence of the bosses 11a and 11b on the pivot pedestal 11. In this state, the plate spring 4 deforms from a flat state into a shape of generally the letter S as shown in FIG. 1. Under this state, a thrusting force, or a loading weight, upon the slider 1 is produced by the resilient force of the plate spring 4 with each of the bosses 11a and 11b of the pivot pedestal 11 functioning as a fulcrum of lever.

Here, an amount of deformation of the plate spring 4 can be varied depending on a thickness of the spacer 50. That is, the thrusting force on the slider 1 can be adjusted by changing the thickness of the spacer 50, if the thrusting force on the slider 1 does not satisfy a prespecified value when measured after the support arm 2 is assembled. The thrusting force of a stronger value can be given by reducing the thickness of the spacer 50, and the thrusting force can be weakened by increasing the thickness of the spacer 50.

Figure 13:
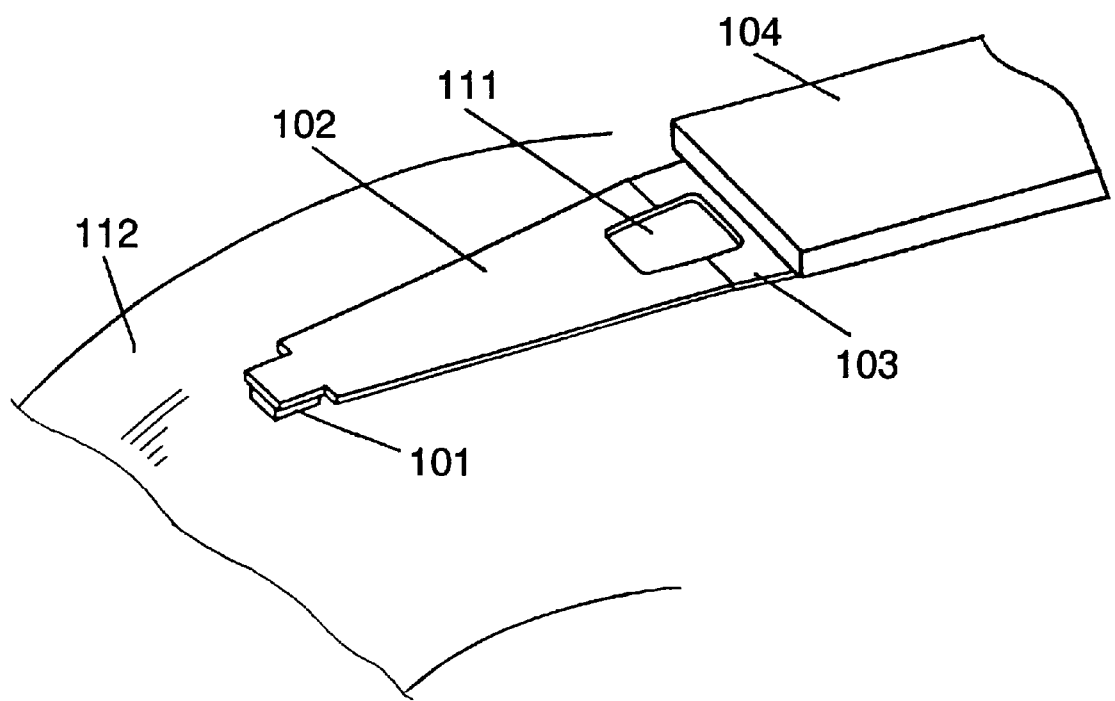
FIG. 13 is a perspective view showing a main portion where a magnetic head is mounted in the conventional head supporting device.

In this instance, a position of the support arm 2 with respect to the magnetic recording medium 12 does not change, even when the thrusting force of the slider 1 is altered by changing the thickness of the spacer 50, so as not to cause any influence to a levitating characteristic of the slider 1. In the head supporting device of the prior art showed in FIG. 13, an inclination of the suspension 102 with respect to the magnetic recording medium 112 changes when a mounting height of the suspension 102 is changed in an attempt to change the thrusting force on the slider 101. This causes an influence to the levitating characteristic of the slider 101 due to a subtle variation in posture of the slider 101, which may results in an adverse effect that requires redesigning of a shape of air streaming surface of the slider 101, and the like.

In adopting this structure of the head supporting device of this exemplary embodiment, the support arm 2 can be formed with a material of high rigidity. Hence, this head supporting device can be constructed into a highly rigid structure with materials of high rigidity throughout it from the pivot pedestal 11 to the individual bosses 11a and 11b of the pivot pedestal, and from a portion of the support arms 2 supported by the pivot pedestal 11 to another portion whereto the slider 1 is formed.

Because a resonance frequency of the support arm 2 can be raised by constructing the support arm 2 of highly rigid structure with rigid materials in the manner as described, there is never a chance of any vibrating mode which has been the problem of the past, and since it does not require a settling operation, it makes possible quick rotation and positioning of the support arm 2, so as to increase an access speed of the magnetic disk drive.

Further, since the plate spring 4 defining the resilient means is provided separately from the support arm 2, instead of being built into the structure of the support arm 2, the plate spring 4 can be selected for the suitable strength and spring constant by changing the thickness, material, and the like of the plate spring 4, so as to adjust easily the thrusting force on the slider 1.

Depending on a structure in using the head supporting device, it is possible to provide the head supporting device with stability and limited vibrations to external shocks by designing the head supporting device in a manner that a center of gravity of a portion retained by the plate spring 4, i.e. a center of gravity of the support arm 2 to which a voice coil and a coil holder are mounted in an instance a voice coil motor is used for rotation, is placed at a position coincident with an intersection between the rotating axis of the support arm 2 in the radial direction of the magnetic recording medium 12 and another rotating axis in the direction perpendicular to the writing surface of the magnetic recording medium 12, that is, practically the same position as an intermediate point P on a line connecting in phantom between the points Pa and Pb where the support arm 2 and the bosses 11a and 11b of the pivot pedestal 11 abut against each other (in FIG. 2, a distance from the point P to the point Pa and another distance from the point P to the point Pb are equal as are shown by a symbol L). Although this is the case that can provide the head supporting device with the greatest resistance to shock, a deviation to certain extent does not present any problem for the practical purposes.

In addition, the support arm 2 is provided with gimbals mechanism 13, and the slider 1 is supported with dimpled boss 14 formed on the underside surface at one end of the support arm 2, as shown in FIG. 1. This realizes the head supporting device having flexibility responsive to undesirable vibrations and the like of the slider 1 in a rolling direction as well as a pitching direction with respect to the magnetic recording medium 12 during operation of the magnetic disk drive.

In the head supporting device of the present invention, as described above, a number of conflicting requirements such as enhancing the thrusting force to the slider 1, improving the flexibility, and increasing rigidity of the head supporting device can be achieved by controlling them independently as separate factors of the individual structural elements.

In other words, a loading adjustment of the thrusting force and adjustment of the spring constant of the plate spring can be made by coordinating the materials and thicknesses of the plate spring 4 and the spacer 50. In addition, an adjustment of rigidness can be made by changing the material, box bending, and the like of the support arm 2, to realize a highly rigid structure. Accordingly this can simplify design of the head supporting device that solves the conflicting requirements of flexibility and rigidness, so as to expand remarkably a degree of flexibility in the design.

In the head supporting device of this invention, the plate spring 4 remains flat under a condition in which no stress is impressed on it. Therefore, the head supporting device can be manufactured easily as compared with the conventional head supporting devices, since it does not require an advance step of preprocessing like very precise forming (e.g. bending process) of the plate spring as has been needed for the conventional ones.

Furthermore, although it has been necessary in the past to replace the suspension with another one having a thrusting force corresponding to a new slider when changing the thrusting force of the slider 1 due to a change in specification of the slider 1, an advantage with the head supporting device of this invention is that the thrusting force can be controlled by adjusting the plate spring 4 or the spacer 50, using the same support arm without making any alterations.

With reference to FIG. 1 and FIG. 2, described next pertains to an operation of the head supporting device of this invention, using a magnetic disk drive as an example.

As described above, the slider 1 is in contact with the magnetic recording medium 12 when the magnetic recording medium 12 is at a standstill. When the magnetic recording medium 12 starts spinning during writing or reading mode, however, the slider 1 levitates, the plate spring 4 deforms, and the magnetic writing or reading is then carried out with the magnetic head maintaining a certain space, or a levitating clearance to the magnetic recording medium 12, while the support arm 2 keeps its posture as shown by a solid line in FIG. 1.

In this instance, a reactive force of the plate spring 4 to return the support arm 2 into the position shown by the dotted line in FIG. 1 acts as a loading weight impressed on the slider 1.

This loading weight impressed on the slider 1 can be designed appropriately by coordinating any of the material and thickness of the plate spring 4, a height of the pair of bosses 11a and 11b of the pivot pedestal 11, or a positional relation of a point G, i.e. a linkage between the support arm 2 and the plate springs 4, and a thickness of the spacer 50.

For instance, a larger loading weight can be impressed on the slider 1 by forming the plate spring 4 into a large thickness with a material of high rigidity. Alternatively, a larger loading weight can also be impressed by raising the bosses 11a and 11b on the pivot pedestal 11, or by bringing a position of the linkage point G between the support arm 2 and the plate spring 4 closer to the point P in FIG. 1. In addition, a larger loading weight can also be impressed by decreasing the thickness of the spacer 50, or the loading weight can be reduced by increasing the thickness of the spacer 50.

Second Exemplary Embodiment

A structure of the head supporting device of this invention that achieves the operating principle shown in the first exemplary embodiment will be disclosed next as a second exemplary embodiment of this invention.

Figure 4:
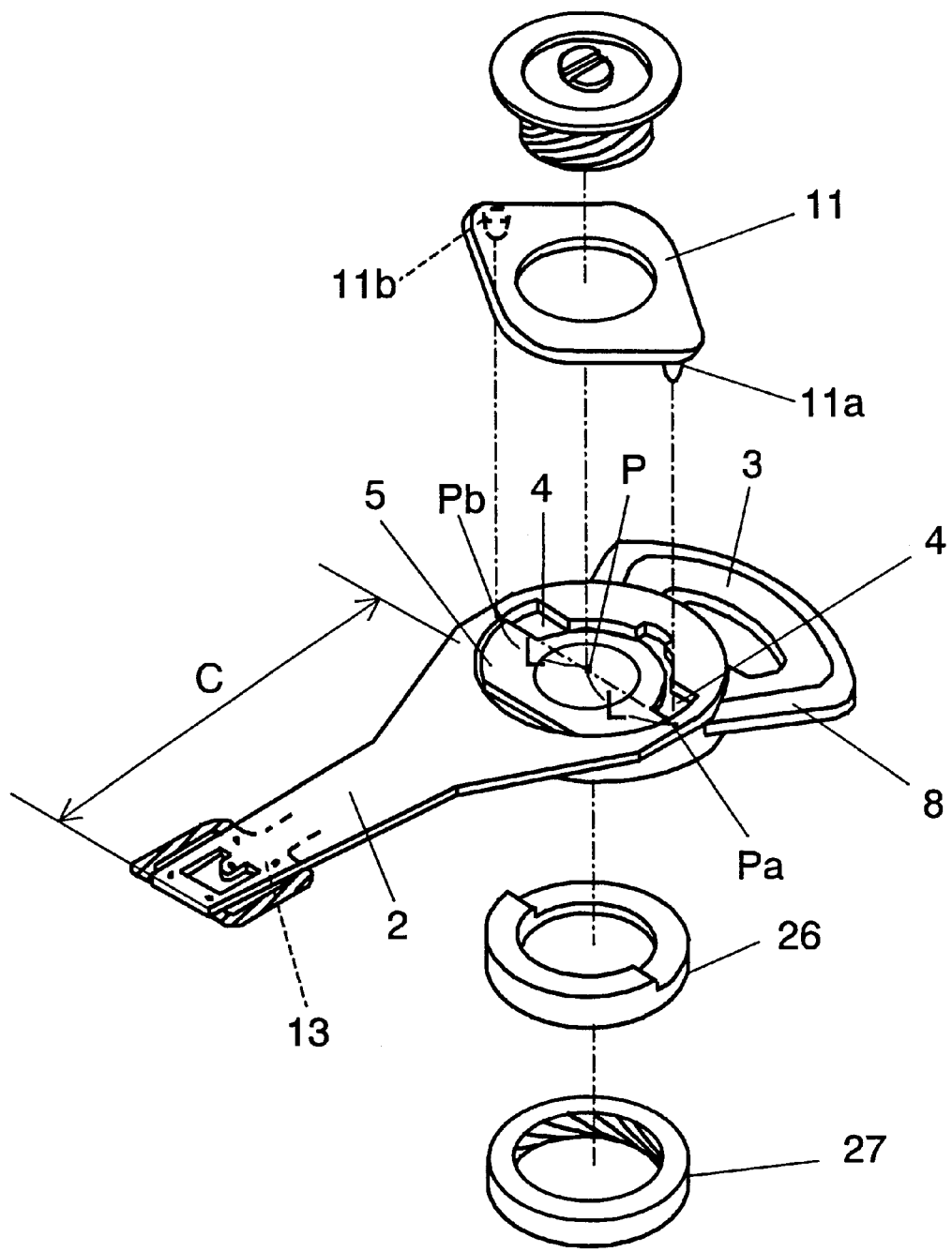
FIG. 4 is an exploded perspective view depicting the structure of the head supporting device according to the second exemplary embodiment of the invention.
Figure 5:
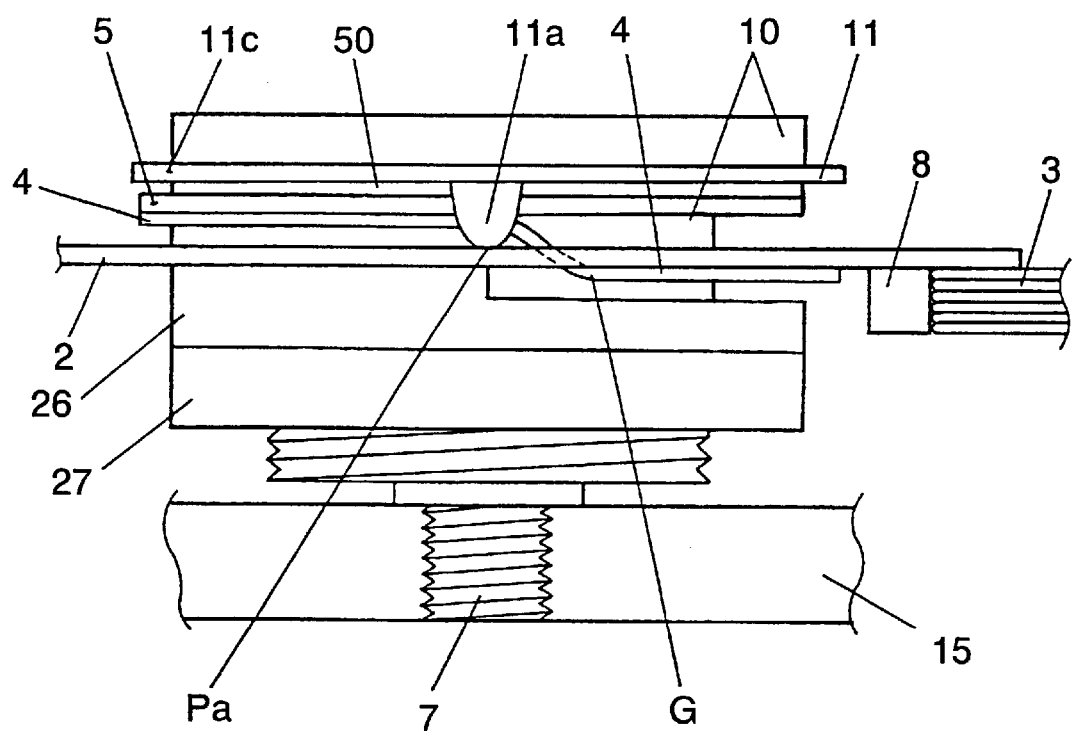
FIG. 5 is a side view showing the structure of the head supporting device, specifically a main portion in the vicinity of a bearing unit, according to the second exemplary embodiment of the invention.

FIG. 3 is an exploded perspective view depicting the structure of the head supporting device of this invention, FIG. 4 is also an exploded perspective view, and FIG. 5 is a side view showing a main portion in the vicinity of a bearing unit of the same.

In the head supporting device 9, plate spring 4 of an annular shape and spring fixation member 5 also of an annular shape are connected by welding at points 4a, 4b, 4c and 4d, as shown in FIG. 3 and FIG. 4. Support arm 2 and the plate spring 4 are connected also by welding at points 4e, 4f, 4g and 4h. The support arm 2 is connected to coil holder 8 provided with coil 3, so as to be rotatable by a voice coil motor in a radial direction of magnetic recording medium 12. This structure is such that the above members, together with pivot pedestal 11, spacer 50 and collar 26, are sandwiched in respective positions between bearing unit 10 and nut 27.

Also, the head supporting device 9 is axially secured in its entirety to chassis 15 by mounting screw 7 disposed to the bearing unit 10, as shown in FIG. 5.

Referring now to FIG. 5, connections throughout the individual component members will be described in more detail. At the start, an upper surface of the plate spring 4 is connected with an underside surface of the support arm 2 at a portion on the right side of the drawing with respect to a rotational axis. The plate spring 4 and the spring fixation member 5, together with collar fringe 11c of the pivot pedestal 11 and the spacer 50, are sandwiched by the bearing unit 10 and the nut 27 at a portion on the left side of the drawing. In this structure, the coil holder 8 is attached to the support arm 2.

By constructing them as described, there is realized the structure in which the plate spring 4 deforms in a manner that it bends into a shape of generally the letter S, as shown in FIG. 5, and the support arm 2 is thus secured flexibly.

In addition, the bearing unit 10 has a bearing built therein, and the support arm 2 can rotate in a radial direction of the magnetic recording medium to move a magnetic head mounted to an underside surface of its one end to an assigned position.

Bosses 11a and 11b on the pivot pedestal 11 are provided in a manner that they abut upon the support arm 2 on a phantom line that is perpendicular to both an axial direction of the bearing unit 10 and a longitudinal direction of the support arm 2, and also traverses a rotational center of the bearing unit 10 in the radial direction of the recording medium.

Further, the bosses 11a and 11b on the pivot pedestal 11 are each arranged in positions that are symmetrical to each other with respect to a centerline along the longitudinal direction of the support arm 2, so that the support arm 2 is pushed downward by this pair of the bosses 11a and 11b.

Also, it is possible to provide the head supporting device with limited vibrations to external shocks and stability, by designing the head supporting device in a manner that a center of gravity of a portion retained by the plate spring 4, i.e. the center of gravity of the support arm 2 to which the coil 3 and the coil holder 8 are mounted, is placed at a position substantially coincident with an intermediate point P on a line connecting in phantom between the points Pa and Pb where the support arm 2 and the bosses 11a and 11b of the pivot pedestal 11 abut against each other (a distance from the point P to the point Pa and another distance from the point P to the point Pb are equal as are shown by a symbol L in FIG. 4). Although this is the case that can provide the head supporting device with the greatest resistance to shock, a deviation to certain extent does not present any problem for the practical purposes.

In this instance, the head supporting device 9 may be so constructed that the center of gravity of the support arm 2 locates at a position substantially coincident with the point P, with the support arm 2 bearing the coil 3, the coil holder 8, the slider 1 and the gimbals mechanism 13, all mounted thereto, taking into account weights of the slider 1 and the gimbals mechanism 13.

Individual component members are described hereinafter. Firstly, the support arm 2 is formed unitary into a thickness of 64 μm with a metal such as stainless steel (SUS304). The support arm 2 may be formed using such methods as etching process and press forming.

A magnetic disk drive featuring a head supporting device of faster rotation speed and faster access than before can be obtained by using the foregoing support arm 2, since it can bring up to very high a resonance frequency of it from approx. 2 kHz of the prior art to approx. 10 kHz.

In addition, a head portion of the support arm 2 may be provided with a bent-up fringe of about 0.2 mm in height in a direction perpendicular to a writing surface of the magnetic recording medium, in an area shown with a symbol C in FIG. 4, in order to improve rigidity of the support arm 2 along its longitudinal direction.

In FIG. 3, the slider 1 is supported tiltably by the gimbals mechanism 13 via a dimpled boss (not show in the figure) in the rolling direction as well as the pitching direction. A magnetic head is disposed to a surface of the slider 1 confronting the magnetic recording medium 12.

The spring fixation member 5 is formed into a thickness of 0.1 mm with a metal such as stainless steel (SUS304), and the plate spring 4 is formed into a thickness of 38 $\mu$m also with a metal such as stainless steel (SUS304). They can be formed with such method as etching process and press forming.

The coil holder 8 is formed into 0.3 mm in thickness using a metal such as aluminum, or PPS (polyphenylene sulfide). It can be formed using die-casting or press forming method in the case of aluminum, and the ordinary known plastic molding method in the case of PPS.

Connections among the individual component members can be made by the known method such as spot welding, ultrasonic welding, laser welding, and the like method.

In this invention, the methods of manufacturing the individual component members and the methods of connecting those component members as described herein are illustrative and therefore not considered as restrictive.

By taking the structure as described above, there can be made available the head supporting device capable of achieving the principle of operation illustrated in the first exemplary embodiment.

Also, by adopting the above structure, the head supporting device 9 is now capable of performing a novel operation that has not been possible with the prior art, since the support arm 2 can turn freely about the bosses 11a and 11b of the pivot pedestal 11 functioning as a fulcrum in the direction perpendicular to the writing surface of the magnetic recording medium.

Figure 11:
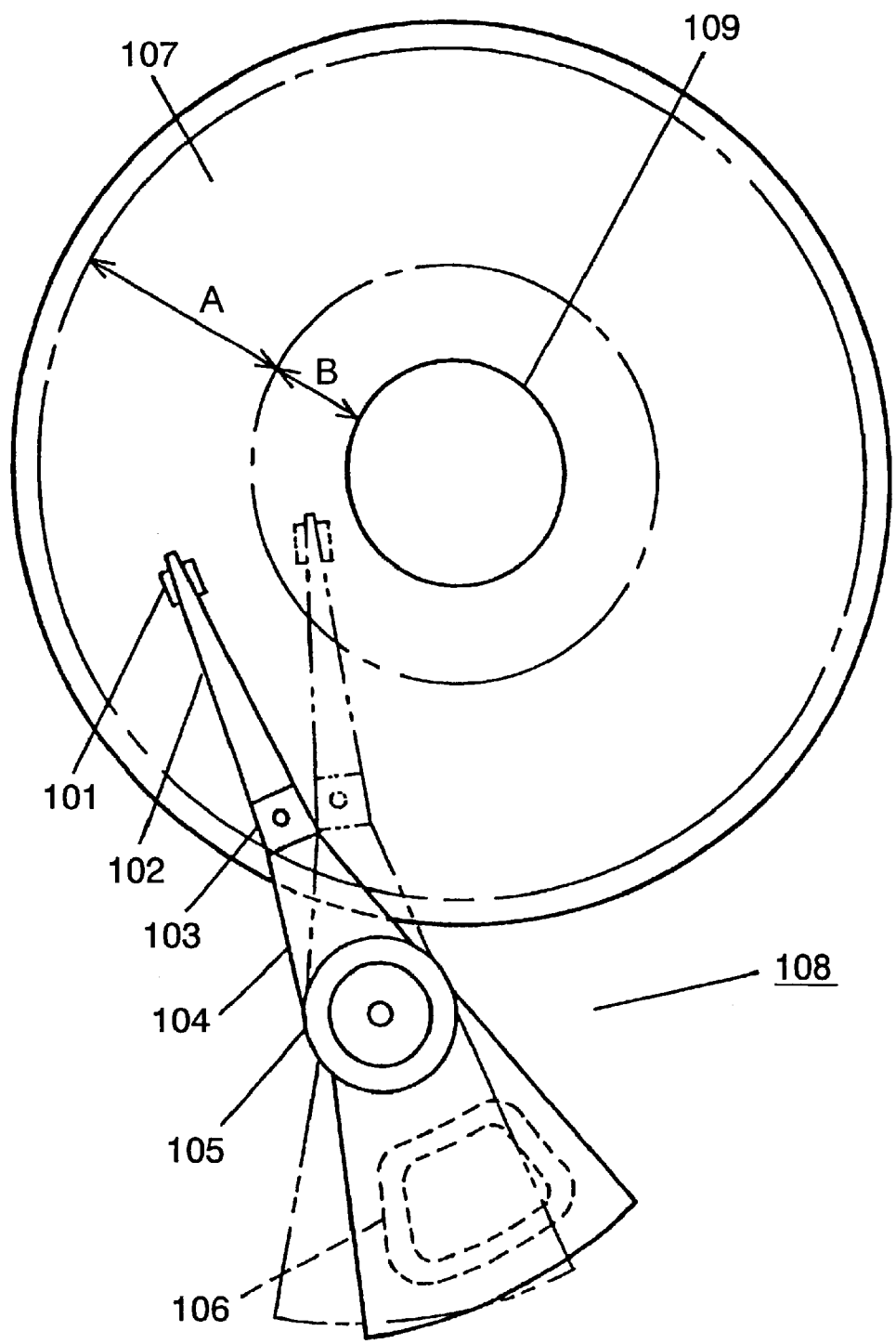
FIG. 11 is a plan view showing a structure of a head supporting device, as well as a relation between the head supporting device and a magnetic recording medium in a conventional magnetic disk drive of the CSS mode.

In other words, with a magnetic disk drive of the CSS mode in FIG. 11, for instance, it has been necessary that a surface of area B is formed rougher than a surface of area A, so as to prevent the slider 1 from adhering to the magnetic recording medium 12 when it comes to a stop, since the support arm 2 has not been vertically movable, as desired, along the direction perpendicular to the magnetic recording medium. According to the head supporting device of this invention, however, the support arm 2 can be moved perpendicularly by any known means, and thereby the support arm 2 can be held standing off from the magnetic recording medium 12 when the magnetic disk drive comes to a stop. This make unnecessary for the magnetic recording medium 12 to provide with a standby area like the area B (i.e. the CSS zone) shown in FIG. 11 for the magnetic head.

Figure 12:
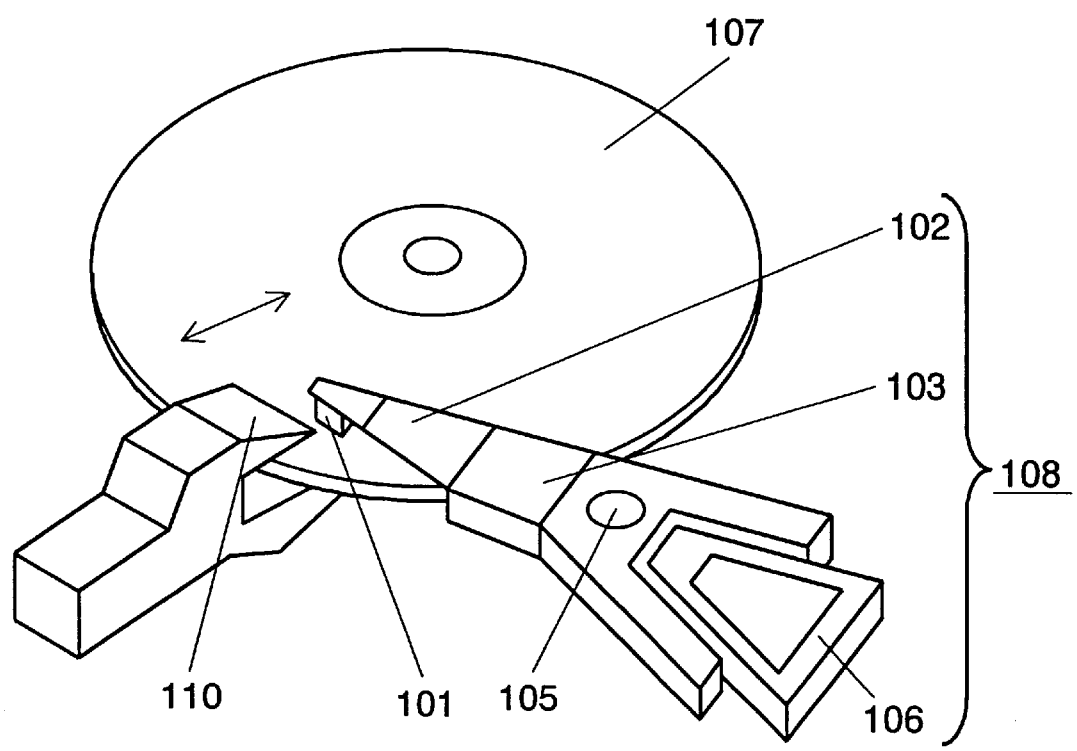
FIG. 12 is a general perspective view depicting a structure of a conventional magnetic disk drive of the L/UL mode.

The head supporting device of the present invention can be used even for a magnetic disk drive of the L/UL mode shown in FIG. 12, wherein the support arm 2 can be made movable perpendicularly by any of the known means and thereby the support arm 2 can be held standing off from the magnetic recording medium 12 when the magnetic disk drive comes to a stop, in the same way as in the case of the magnetic disk of the CSS mode. Accordingly, a useless area can be reduced in a fringe area on the magnetic recording medium as in the past, such as the one where a ramp is disposed for loading and unloading the magnetic head.

In this exemplary embodiment, although what has been described is the structure wherein the head supporting device 9 is provided with the spacer 50, this shall not be considered as restrictive, and the head supporting device of this invention can be a structure not including the spacer 50, as needless to note. When this is the case, the thrusting force on the slider 1 can be adjusted by choosing a material, thickness, and the like of the plate spring 4.

In the exemplary embodiment of this invention, what has been described is the head supporting device for magnetic disk drive which employs a magnetic head. However, the head supporting device of this invention has similar advantageous features even if it is used as a head supporting device of a disk-type write/read device that uses a non-contact type head, such as an optical disk drive, a magneto-optic disk drive, and the like.

Third Exemplary Embodiment

Figure 6:
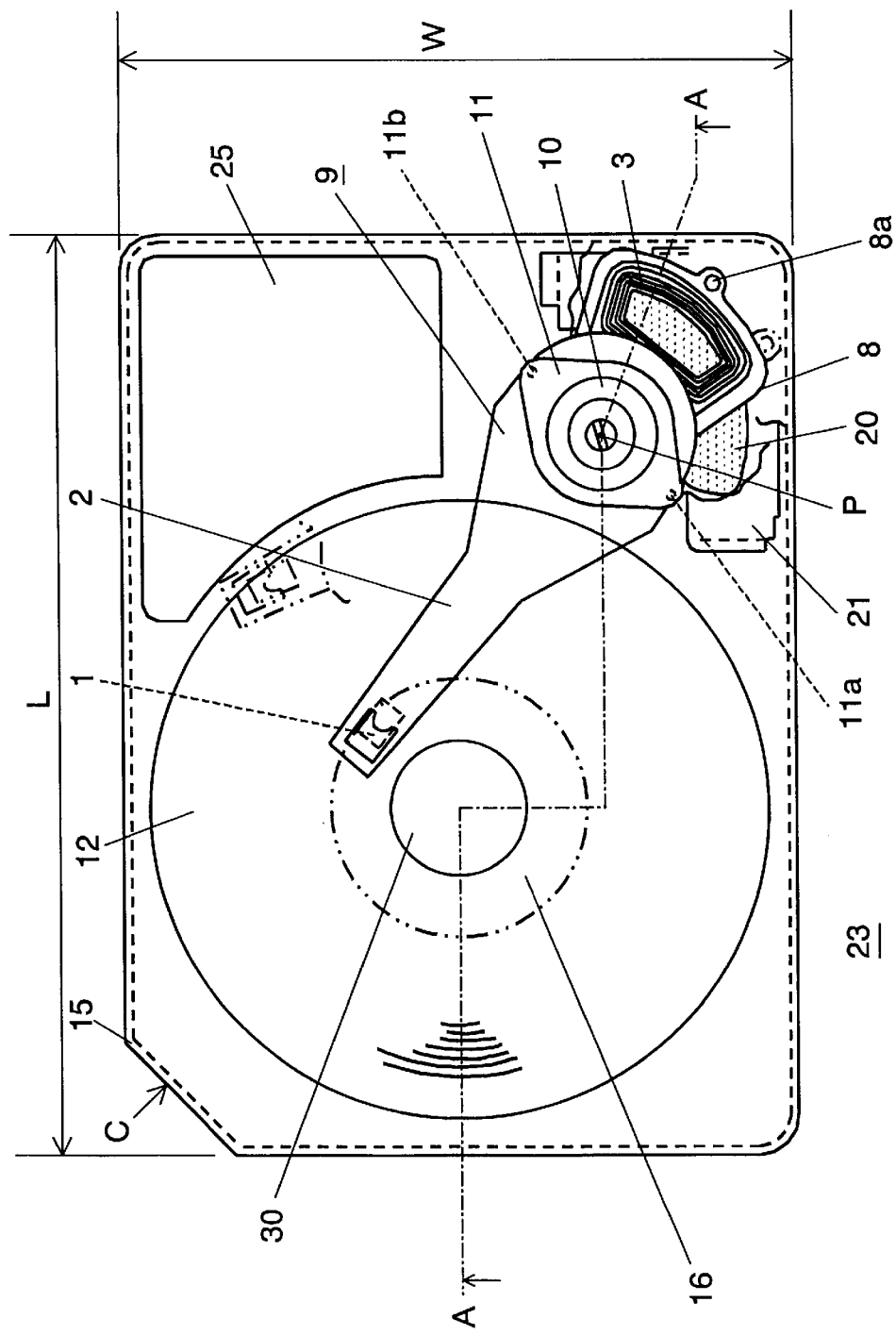
FIG. 6 is a plan view depicting a structure of a magnetic disk drive according to the third exemplary embodiment of the invention.

Referring to the accompanying figures, a structure of a disk drive of this invention will be described using a magnetic disk drive as an example of the third exemplary embodiment. FIG. 6 is a plan view depicting a structure of magnetic disk drive 23 of the present invention, and FIG. 7 is a sectional view taken along a line A—A in FIG. 6.

A structure and operation of the magnetic disk drive of the invention and its head supporting device will be described first.

Figure 7:
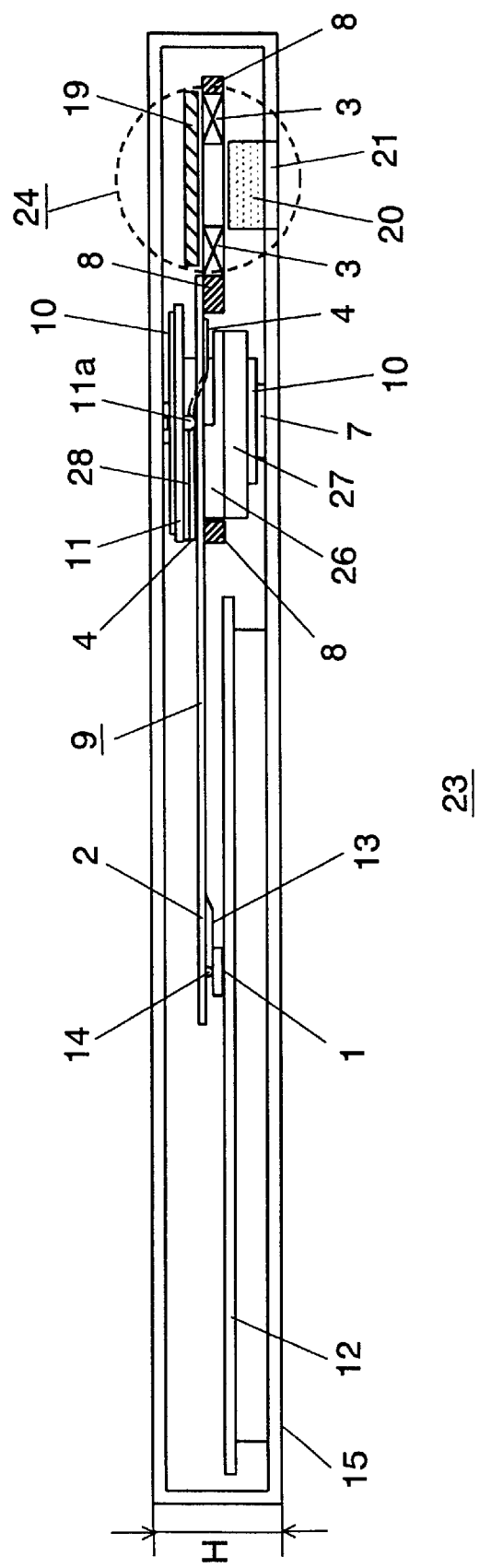
FIG. 7 is a sectional view depicting the structure of the magnetic disk drive according to the third exemplary embodiment of the invention.

FIG. 6 and FIG. 7 illustrate the magnetic disk drive when it is not operating, i.e. in a state that a magnetic recording medium is not spinning.

Magnetic disk drive 23 of the present invention is provided with head supporting device 9 having support arm 2 formed unitary with a single material, as shown in FIG. 6 and FIG. 7.

Figure 8:
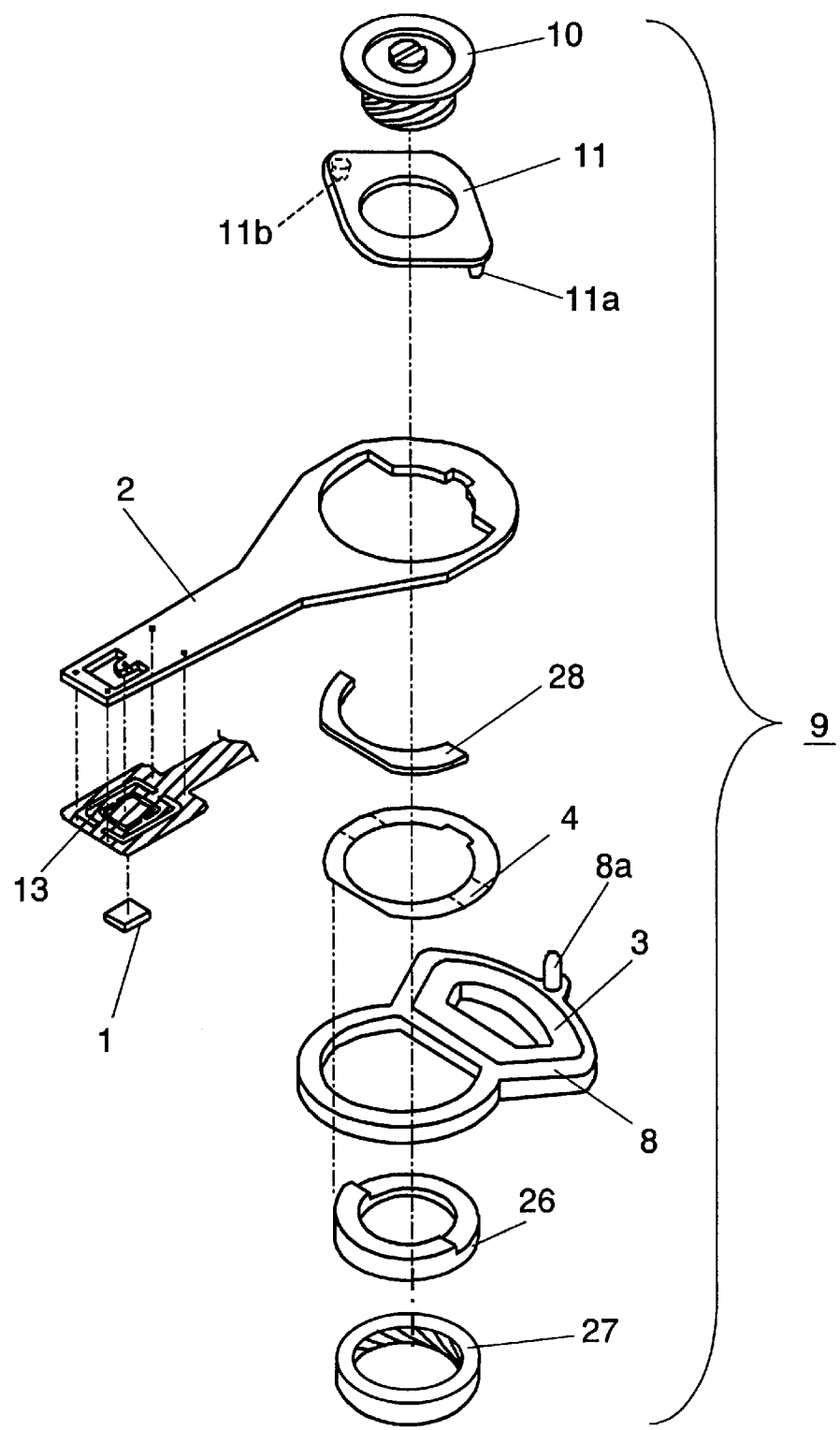
FIG. 8 is an exploded perspective view depicting a structure of a head supporting device of the magnetic disk drive according to the third exemplary embodiment of the invention.

The structure of the head supporting device 9 of the magnetic disk drive 23 of this invention is described hereinafter with reference to FIG. 6, FIG. 7 and FIG. 8. FIG. 8 is an exploded perspective view covering an entire portion of the head supporting device 9 of the magnetic disk drive 23 of this invention.

The head supporting device 9 is so constructed that plate spring 4 of generally an annular shape and spring fixation member 28 of generally semi-annular shape are connected together at a portion on the left side of the drawing with respect to a rotational axis in FIG. 7, and the plate spring 4 is connected to the support arm 2 at a portion on the right side of the drawing with respect to the rotational axis. The support arm 2 is connected to coil holder 8 having coil 3 mounted thereto, so as to be rotatable by a function of voice coil motor in a radial direction of the magnetic recording medium 12. In this structure, these component members, together with pivot pedestal 11 and collar 26, are sandwiched between bearing unit 10 and nut 27.

With an adoption of the structure as described, the support arm 2 is retained flexibly via the plate spring 4 to the pivot pedestal 11 having a pair of bosses 11a and 11b, as shown in FIG. 7, and thereby the support arm 2 becomes freely turnable in the direction perpendicular to the magnetic recording medium 12, about a fulcrum served by the bosses 11a and 11b of the pivot pedestal 11.

The pair of bosses 11a and 11b formed on the pivot pedestal 11 are so arranged that they abut against the support arm 2 in positions that are symmetrical to each other with respect to a centerline of the support arm 2 along a phantom line that is perpendicular to both a direction of a central axis of rotation, in which the support arm 2 rotates in a radial direction of the magnetic recording medium 12, and a longitudinal direction of the support arm 2, and also traverses the central axis of rotation.

Furthermore, the support arm 2 has slider 1 which is mounted to a surface at its one end facing the magnetic recording medium 12, and a magnetic head (not show in the figure) is disposed to a surface of the slider 1 confronting the magnetic recording medium 12.

In addition, the coil 3 mounted to the coil holder 8 connected to the other end of the support arm 2 composes voice coil motor 24 (hereinafter referred to as VCM) in combination with magnet 20 disposed to chassis 15 of the magnetic disk drive 23, upper yoke 19 (not show in FIG. 6), and lower yoke 21. Thus, the support arm 2 is constructed rotatably about the bearing unit 10 in a radial direction of the magnetic recording medium 12 by function of the VCM 24. The bearing unit 10 is also mounted rotatably to the chassis 15 by mounting screw 7 composed through a bearing.

The magnetic recording medium 12 is axially supported by spindle motor 30 defining a spinning means. During writing or reading operation of the magnetic disk drive 23, i.e. when the magnetic head is loaded, the magnetic head mounted to the slider 1 receives a certain amount of levitation associated with a levitational force of airflow generated by spinning of the magnetic recording medium 12 driven by the spindle motor 30 and a thrusting force of the head supporting device 9 for shifting the slider 1 toward the magnetic recording medium 12, and performs writing or reading.

In this instance, the slider 1 receives a predetermined amount of the thrusting force, or a loading weight, impressed thereon in the direction toward the magnetic recording medium 12. This loading weight is produced by the plate spring 4 defining resilient means disposed to the head supporting device 9.

Besides, gimbals mechanism 13 utilizing a gimbals spring is provided to tiltably support the slider 1 via dimpled boss 14 in its rolling as well as pitching directions, as shown in FIG. 7 and FIG. 8, thereby the gimbals mechanism 13 can absorb undesirable vibrations of the slider 1 in the rolling and pitching directions with respect to the magnetic recording medium 12 during writing or reading operation of the magnetic disk drive 23.

Every control to start and stop spinning of the magnetic recording medium 12, and to rotate the support arm 2 is performed by control means 25 shown in FIG. 6.

Described hereinbelow will pertain to the individual component members. First, the support arm 2 in this exemplary embodiment is formed unitary with a metal such as stainless steel (SUS304). The support arm 2 may be formed using such methods as etching process and press forming.

The plate spring 4 is also formed of a metal such as stainless steel (SUS304). Processing and forming of this component can be made through etching process or press forming.

The coil holder 8 is formed of a metal such as aluminum, or a plastic material such as PPS (polyphenylene sulfide), LCP (liquid crystalline polymer) and the like. It can be formed using die-casting or press forming method in the case of aluminum, and the known plastic molding method in the case of PPS or LPC.

In addition, the upper yoke 19 and the lower yoke 21 are made of annealed magnetic material such as SECC, and they can be processed and formed using the method of press forming.

Further, a rare earth magnet of neodymium-iron-boron group alloy is used for the magnet 20.

Connections among the individual component members can be made by the known method such as spot welding, ultrasonic welding, laser welding, and the like method.

In this invention, the methods of manufacturing the individual component members and the methods of connecting those component members as described herein are illustrative and not considered as restrictive.

In the magnetic disk drive 23 of this invention, the support arm 2 can be formed with a material of high rigidity by adopting this structure for the head supporting device 9.

Hence, the head supporting device 9 can be constructed with the materials of high rigidity throughout it from the pivot pedestal 11 to the individual bosses 11*a* and 11*b* of the pivot pedestal 11, and form a portion of the support arms 2 supported by the pivot pedestal 11 to a portion whereto the slider 1 is disposed.

Also, as the support arm 2 is formed unitary with a material of high rigidity such as stainless steel (SUS304), not only can it improve resistance to shock upon external shocks and the like, but also increase a resonance frequency of the support arm 2 from approx. 2 kHz of the prior art to a very high frequency of approx. 10 kHz. Accordingly, there can be realized a magnetic disk drive featuring the head supporting device of a faster rotation speed and faster access than before.

Further, because the plate spring 4 defining the resilient means is disposed independently from the support arm 2, instead of being built into the structure of the support arm 2, a strength and spring constant of the plate spring 4 can be set freely by changing the thickness, material and so on of the plate spring 4.

Furthermore, depending on a structure in using the head supporting device 9, it makes possible to provide the head supporting device with limited vibrations to external shocks and stability, by designing the head supporting device 9 in a manner that a center of gravity of a portion retained by the plate spring 4, i.e. the center of gravity of the support arm 2 with the coil 3 and the coil holder 8 mounted thereto in the case it is rotated by the VCM 24, is placed in a position substantially coincident with an intersection between the rotating axis of the support arm 2 in the radial direction of the magnetic recording medium 12 and another rotating axis in the direction perpendicular to the writing surface of the magnetic recording medium 12, that is, a practically same position as an intermediate point (a point P shown in FIG. 6) on a line connecting in phantom between two points where the support arm 2 and the bosses of the pivot pedestal 11 abut against each other.

Although this is the case that can provide the head supporting device with the greatest resistance to shocks, a deviation to certain extent does not present any problem for the practical purposes.

Described next pertains to means and its operation for retracting the magnetic head in the magnetic disk drive of this exemplary embodiment.

In FIG. 6 and FIG. 7, there is CSS zone 16 in a given area on an internal fringe of the magnetic recording medium 12 wherein the slider 1 disposed to one end of the support arm 2 is retracted to remain standing.

The CSS zone 16 has a surface formed rougher than other area where is magnetically recordable, and thereby it is not likely that the slider 1 or the magnetic head adhere to the magnetic recording medium 12.

When the magnetic recording medium 12 is to stop spinning, one end of the support arm 2 where the slider 1 is disposed rotates toward an inner area of the magnetic recording medium 12. As spinning of the magnetic recording medium 12 is being slowed down, the levitational force decreases because the airflow decreases, the slider 1 disposed to the one end of the support arm 2 comes to contact with the magnetic recording medium 12 in the CSS zone 16, and the slider 1 finally stops at that position.

Figure 9:
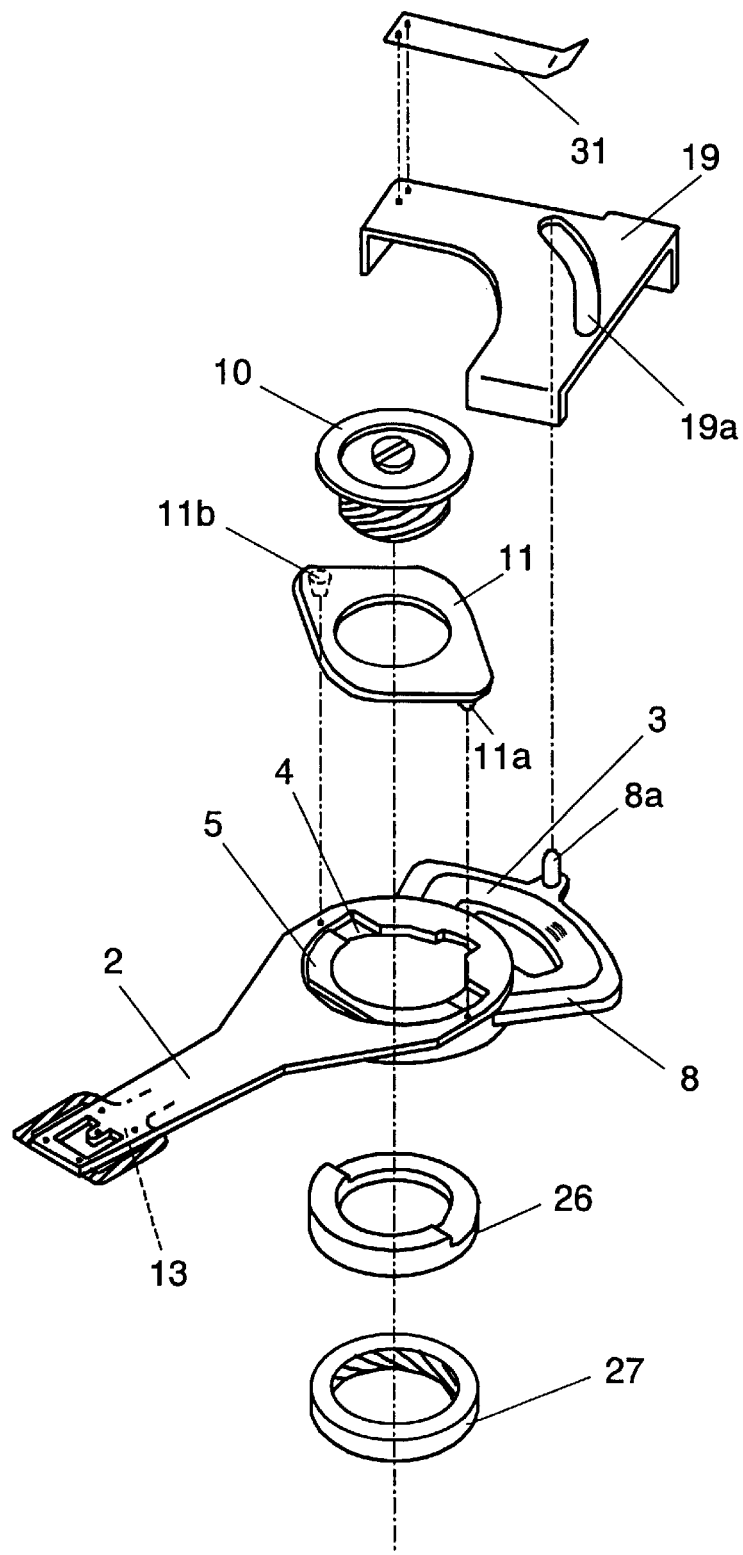
FIG. 9 is a perspective view depicting a structure of depressing means of the magnetic disk drive according to the third exemplary embodiment of the invention.

In the head supporting device 9 of the disk drive 23 of this invention, the coil 3 is so arranged as to be placed between the upper yoke 19 and the magnet 20 from the upper and lower sides, as shown in FIG. 7, and plate spring 31 serving as depressing means is disposed to the upper yoke 19 as shown in FIG. 9. A metal having good slidable property is used for the plate spring 31, such as stainless steel of SUS 420J2 and the like.

The plate spring 31 is designed to have a spring constant as small as practical so as to reduce as low as possible the dispersion in loading weight impressed on the support arm resulting from the dispersion in relative position and the like of the structural members in the manufacturing processes.

In addition, the upper yoke 19 having slit opening 19a is placed above the coil holder 8 as shown in FIG. 9, so that boss 8a provided on the coil holder 8 is movable along the slit opening 19a.

Furthermore, the plate spring 31 is disposed to the upper yoke 19 in a manner to cover the slit opening 19a. The plate spring 31 is fixed to the upper yoke 19 at only one end of it, so that the other end is vertically movable by the resilient force in a direction perpendicular to the magnetic recording medium 12.

With this structure, friction between the slider 1 or the magnetic head and the magnetic recording media 12 can be reduced, since the plate spring 31 defining the depressing means thrusts the boss 8a on the coil holder 8 in a direction toward the magnetic recording medium 12 when the support arm 2 is being rotated to the inner side in the radial direction of the magnetic recording medium 12 to retract the slider 1 into the CSS zone 16. This can thus reduce the load imposed on the spindle motor 30 when spinning the magnetic recording medium 12 during a start of the magnetic disk drive 23.

Figure 10:
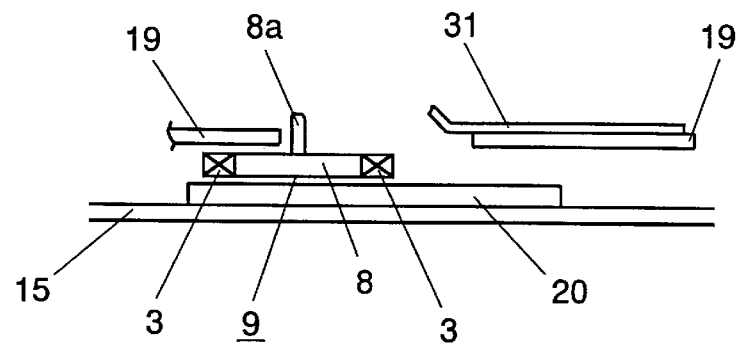
FIG. 10 is a set of schematic illustrations showing operation of the magnetic disk drive according to the third exemplary embodiment of the invention.
Figure 10:
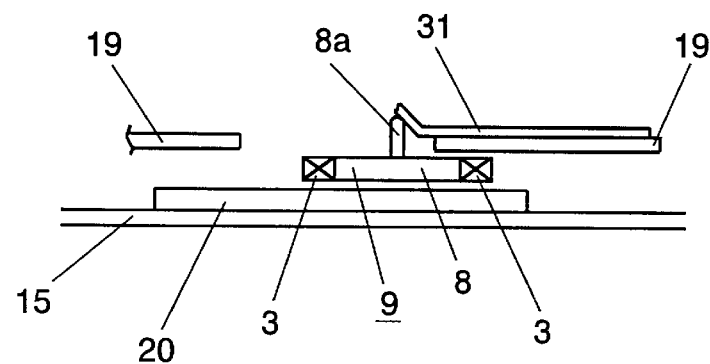
Figure 10:
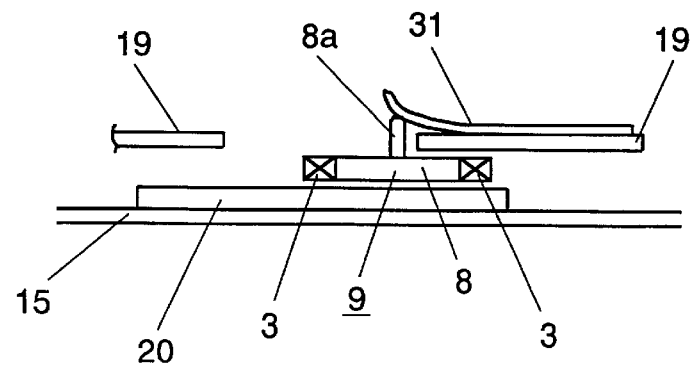

Referring to FIG. 10, the mechanism that can reduce the load imposed on the spindle motor 30 is described in more detail. FIG. 10 represents schematic illustrations showing positional relations among the other end of the head supporting device 9 (shown here are the coil 3 and the coil holder 8), the upper yoke 19, the plate spring 31 and the magnet 20 in states where the magnetic disk drive 23 is operating and also at a standstill.

As shown in FIG. 10, the plate spring material 31 defining the depressing means is secured to the upper yoke 19. When the magnetic recording medium 12 is spinning, i.e. the magnetic head is loaded on the magnetic recording medium 12, the head supporting device 9 moves rotatory with distance away from the plate spring 31, as shown in FIG. 10A.

Next, when the magnetic recording medium 12 stops spinning, that is, the magnetic head is being retracted, the support arm 2 moves rotatory in the radial direction of the magnetic recording medium 12, and the one end of the support arm 2 bearing the slider 1 shifts toward the inner area of the magnetic recording medium 12 as stated above. The other end of the head supporting device 9 including the coil holder 8 shown in FIG. 10A moves toward the right side on the drawing into a position shown in FIG. 10B, and the boss 8a of the coil holder 8 comes in contact to the plate spring 31.

In this structure, the boss 8a of the coil holder 8 begins to be thrust by the plate spring 31 at about the same time as the slider 1 disposed to the one end of the support arm 2 enters the CSS zone 16.

When the support arm 2 advances furthermore, the head supporting device 9 is thrust toward the magnet 20 by the resilient force of the plate spring 31 as shown in FIG. 10C. A distance between the upper yoke 19 and the coil holder 8 remains unchanged from that shown in FIG. 10A at all the time.

When the magnetic disk drive 23 of this invention stops operating, the slider 1 stays in contact with the CSS zone 16, and is held in this position. As the thrusting force is impressed on the support arm 2 in the direction of lifting up the one end bearing the slider 1 from the magnetic recording medium 12, friction of the slider 1 or the magnetic head to the magnetic recording medium 12 becomes smaller, so as to make the magnetic head or the slider 1 unlikely to adhere with the magnetic recording medium 12. This accomplishes a substantial reduction of the torque required for starting the spindle motor 30 as compared to that of the prior art.

Since this reduces the requires torque for the spindle motor 30, there is realized a reduction in dimensions of a portion occupied by the spindle motor 30 while satisfying the necessary torque, when the entire magnetic disk drive is downsized. Therefore, the magnetic disk drive 23 can be made smaller and thinner in its entirety.

In the disk drive of this invention, an enclosure of it is so constructed as to be the same dimensions as external dimensions of an SD memory card. The dimensions formed are 32 mm long (L) by 24 mm wide (W) by 2.1 mm high (H) as shown in FIG. 6 and FIG. 7, and it has a shape that one corner is chamfered by 4 mm as marked with a symbol C in FIG. 6.

The chamfer C may be formed at a corner opposite an area where the bearing unit 10 of the support arm 2 is disposed (an upper left corner in FIG. 6).

By making the magnetic disk drive 23 to adopt the foregoing structure, the resilient force of the plate spring 31 may be so designed as to be equal to or slightly smaller than the load of the plate spring 4 placed upon the support arm 2.

Since a sliding resistance between the magnetic head or the slider 1 and the magnetic recording medium 12 can be minimized by the above design, the load required for starting the spindle motor 30 can be reduced further, thereby realizing downsizing and low-profiling of the magnetic disk drive 23 more efficiently.

In this exemplary embodiment, although what has been disclosed is an example in that the plate spring 31 is disposed to the upper yoke 19, this plate spring 31 can be disposed to the chassis 15 to obtain similar advantages, as needless to mention.

In addition, the structure incorporating the plate spring 31 of the shape as shown in this exemplary embodiment can alleviate the coil holder 8 from receiving a shock when it abuts against the plate spring 31.

Furthermore, it is not likely to pose a problem as normally associated with the conventional head supporting devices of the load/unload mode, in that the slider 1 causes damages to the magnetic recording medium 12 mechanically and/or magnetically, when the magnetic head is loaded from the unloaded position, or unloaded from the loaded position.

In addition, the depressing means can be constructed by providing the plate spring 31 with a film formed by surface treatment such as coating and the like with a material of good slidableness such as fluororesin, DLC (diamond-like carbon), and the like, for instance, to realize a low coefficient of friction.

Such structure can realize a further reduction of the load in starting the spindle motor 30.

In this exemplary embodiment, what has been shown is an example in which the CSS zone 16 is provided on the inner fringe of the magnetic recording medium 12. However, a quite similar benefit can be attained by disposing the plate spring 31 as the depressing means of this invention at the left side of the head supporting device 9 on the drawing in FIG. 6, even when the CSS zone 16 is provided around an outer periphery of the magnetic recording medium 12, as needless to note.

Although the magnetic disk drive described in this exemplary embodiment has the structure equipped with one unit of the head supporting device 9, the magnetic disk drive of this invention is not restrictive. The invention may be practiced in still other ways such as a structure provided with a plurality of the head supporting devices 9. For example, the magnetic recording medium 12 may be provided with a writing surface on each of the two surfaces, and each of the head supporting devices 9 disposed to corresponding side thereof.

Further, the structure described in this exemplary embodiment is provided with the depressing means disposed to the head supporting device 9 mounted to the magnetic disk drive 23. However, the disk drive of this invention is not restrictive only to the illustrated structure, and it needs not include the depressing means.

Furthermore, the magnetic disk drive 23 shown in this exemplary embodiment is a magnetic disk drive of the CSS mode, and it employs the structure in which the thrusting force is reduced by the depressing means when the mounted head supporting device enters into the CSS zone. However, the disk drive of the present invention is not restricted to only the CSS mode, but it is also adaptable to other systems such as a disk drive of the L/UL mode.

As an alternative structure, the head supporting device may be designed to be pushed by the depressing means to separate the slider 1 from the recording medium.

In these exemplary embodiments of the invention, although what has been shown is the magnetic disk drive equipped with a magnetic head, the disk drive of the present invention also exhibits similar advantages when adapted to other disk write/read devices of non-contact type such as an optical disk drive, a magneto-optic disk drive, and the like.

Reference Numerals

1. Slider
2. Support arm
3. Coil
4. Plate spring
5. Spring fixation member
7. Mounting screw
8. Coil holder
8a. Boss
9. Head supporting device
10. Bearing unit
11. Pivot pedestal
11a, 11b. Boss
11c. Collar fringe
12. Magnetic recording medium
13. Gimbals mechanism
14. Dimpled boss
15. Chassis
16. CSS zone
19. Upper yoke
19a. Slit opening
20. Magnet
21. Lower yoke
23. Magnetic disk drive
24. Voice coil motor
25. Control means
26. Collar
27. Nut
28. Spring fixation member
30. Spindle motor
31. Plate spring
50. Spacer

What is claimed is:

1. A head supporting device comprising:

a support arm; and a head mounted to an underside surface at one end of said support arm, wherein said support arm is disposed rotatably about a bearing unit in any of a radial direction of a recording medium and a perpendicular direction to a writing surface of said recording medium, and said support arm is provided with resilient means for imposing a thrusting force on said support arm in a direction toward said recording medium.

2. The head supporting device as set forth in claim 1, wherein said resilient means comprises a plate spring disposed between said bearing unit and said support arm.

3. The head supporting device as set forth in claim 1, wherein said head is retained by a slider disposed to said support arm.

4. The head supporting device as set forth in claim 3 further comprising a gimbals mechanism disposed to said support arm for supporting said slider freely movably in any of a rolling direction and a pitching direction.

5. The head supporting device as set forth in claim 1, wherein a center of gravity of a portion held by said resilient means is located generally in a point of intersection between a rotational axis of said support arm in the radial direction of said recording medium and another rotational axis in the perpendicular direction to said writing surface of said recording medium.

6. A head supporting device comprising:

a support arm; and a head mounted to an underside surface at one end of said support arm, wherein said support arm is disposed rotatably about a bearing unit in any of a radial direction of a recording medium and a perpendicular direction to a writing surface of said recording medium, said support arm is provided with resilient means for imposing a thrusting force on said support arm in a direction toward said recording medium, said bearing unit is provided with a pivot pedestal having a pair of bosses disposed in a manner to contact with said support arm, and said support arm is disposed rotatably in the perpendicular direction to said writing surface about a fulcrum served by points where said bosses on said pivot pedestal abut on said support arm.

7. The head supporting device as set forth in claim 6, wherein said pair of bosses provided on said pivot pedestal are arranged to abut on said support arm on a line perpendicular to both an axial direction of said bearing unit and a longitudinal direction of said support arm, said line traversing a rotational center of said bearing unit in the radial direction of said recording medium.

8. The head supporting device as set forth in claim 7, wherein said bosses on said pivot pedestal are each arranged to positions symmetrical to each other with respect to a centerline in the longitudinal direction of said support arm.

9. The head supporting device as set forth in claim 6, wherein said resilient means comprises a plate spring disposed between said bearing unit and said support arm.

10. The head supporting device as set forth in claim 6, wherein said head is retained by a slider disposed to said support arm.

11. The head supporting device as set forth in claim 6, wherein a center of gravity of a portion held by said resilient means is located generally in a point of intersection between a rotational axis of said support arm in the radial direction of said recording medium and another rotational axis in the perpendicular direction to said writing surface of said recording medium.

12. A head supporting device comprising:

a support arm; and a head mounted to an underside surface at one end of said support arm, wherein said support arm is disposed rotatably about a bearing unit in any of a radial direction of a recording medium and a perpendicular direction to a writing surface of said recording medium, said support arm is provided with resilient means for imposing a thrusting force in a direction toward said recording medium, wherein said head supporting device further comprises fixing means for securing said resilient means to said bearing unit, and adjusting means for adjusting a securing position of said resilient means to said bearing unit with said fixing means and for changing an amount of stress of said resilient means.

13. The head supporting device as set forth in claim 12, wherein said adjusting means comprises a spacer disposed between said resilient means and said bearing unit.

14. The head supporting device as set forth in claim 12, wherein said resilient means comprises a plate spring disposed between said bearing unit and said support arm.

15. The head supporting device as set forth in claim 12, wherein said head is retained by a slider disposed to said support arm.

16. The head supporting device as set forth in claim 12, wherein a center of gravity of a portion held by said resilient means is located generally in a point of intersection between a rotational axis of said support arm in the radial direction of said recording medium and another rotational axis in the perpendicular direction to said writing surface of said recording medium.

17. A disk drive comprising:

a recording medium;

spinning means for spinning said recording medium;

a support arm provided with a slider carrying a head thereon, said slider mounted to one end of said support arm on a surface confronting said recording medium, said support arm disposed rotatably about a bearing unit in any of a direction along a writing surface of said recording medium and another direction perpendicular to said writing surface;

resilient means for providing said support arm with a thrusting force in a direction toward said recording medium; and driving means for rotating said support arm in a radial direction of said recording medium.

18. A disk drive comprising:

a recording medium;

a spinning means for spinning said recording medium;

a support arm provided with a slider carrying a head thereon, said slider mounted to one end of said support arm on a surface confronting said recording medium, said support arm disposed rotatably about a bearing unit in any of a direction along a writing surface of said recording medium and another direction perpendicular to said writing surface;

resilient means for providing said support arm with a thrusting force in a direction toward said recording medium; and driving means for rotating said support arm in a radial direction of said recording medium, wherein bearing unit is provided with a pivot pedestal having a pair of bosses disposed in a manner to contact with said support arm, and said support arm is disposed rotatably in a perpendicular direction to said writing surface about a fulcrum served by points where said bosses on said pivot pedestal abut upon said support arm.

19. The disk drive as set forth in claim 18, wherein said pair of bosses provided on said pivot pedestal are arranged to abut on said support arm on a line perpendicular to both an axial direction of said bearing unit and a longitudinal direction of said support arm, said line traversing a rotational center of said bearing unit in the radial direction of said recording medium.

20. The disk drive as set forth in claim 19, wherein said bosses on said pivot pedestal are each arranged to positions symmetrical to each other with respect to a centerline in the longitudinal direction of said support arm.

21. A disk drive as set forth in claim 18, wherein said resilient means comprises a plate spring disposed between said bearing unit and said support arm.

22. A disk drive as set forth in claim 18, further comprising a gimbals mechanism disposed to said support arm for supporting said slider freely movably in any of a rolling direction and a pitching direction.

23. A disk drive as set forth in claim 18, wherein a center of gravity of a portion held by said resilient means is located generally in a point of intersection between a rotational axis of said support arm in the radial direction of said recording medium and a rotational axis in the perpendicular direction to said writing surface of said recording medium.

24. A disk drive as set forth in claim 18, wherein said driving means uses a function of a voice coil disposed to said support arm.

25. A disk drive comprising:

a recording medium;

a spinning means for spinning said recording medium;

a support arm provided with a slider carrying a head thereon, said slider mounted to one end of said support arm on a surface confronting said recording medium, said support arm disposed rotatably about a bearing unit in any of a direction along a writing surface of said recording medium and another direction perpendicular to said writing surface;

resilient means for providing said support arm with a thrusting force in a direction toward said recording medium; and driving means for rotating said support arm in a radial direction of said recording medium, wherein said disk drive further comprises fixing means for securing said resilient means to said bearing unit, and adjusting means for adjusting a securing position of said resilient means to said bearing unit with said fixing means and for changing an amount of stress of said resilient means.

26. The disk drive as set forth in claim 25, wherein said adjusting means comprises a spacer disposed between said resilient means and said bearing unit.

27. A disk drive as set forth in claim 25, wherein said driving means uses a function of a voice coil disposed to said support arm.

28. A disk drive as set forth in claim 25, wherein said resilient means comprises a plate spring disposed between said bearing unit and said support arm.

29. A disk drive as set forth in claim 25, further comprising a gimbals mechanism disposed to said support arm for supporting said slider freely movably in any of a rolling direction and a pitching direction.

30. A disk drive as set forth in claim 25, wherein a center of gravity of a portion held by said resilient means is located generally in a point of intersection between a rotational axis of said support arm in the radial direction of said recording medium and a rotational axis in the perpendicular direction to said writing surface of said recording medium.

31. A disk drive comprising:

a recording medium;

a spinning means for spinning said recording medium;

a support arm provided with a slider carrying a head thereon, said slider mounted to one end of said support arm on a surface confronting said recording medium, said support arm disposed rotatably about a bearing unit in any of a direction along a writing surface of said recording medium and another direction perpendicular to said writing surface;

resilient means for providing said support arm with a thrusting force in a direction toward said recording medium;

driving means for rotating said support arm in a radial direction of said recording medium; and depressing means for decreasing the thrusting force impressed on said support arm by said resilient means when said support arm is rotatory moved to the radial direction of said recording medium and retracted to a predetermined area on said writing surface of said recording medium while said head is kept in contact with said writing surface.

32. A disk drive as set forth in claim 31, wherein said depressing means comprises a plate spring disposed to another end of said support arm for depressing said another end of said support arm when said head is being retracted.

33. A disk drive as set forth in claim 31, wherein said depressing means is disposed in a manner to decrease the thrusting force to an extent equal to or slightly smaller than the thrusting force impressed upon said support arm.

34. A disk drive as set forth in claim 31, wherein said driving means uses a function of a voice coil disposed to said support arm.

35. A disk drive as set forth in claim 31, wherein said resilient means comprises a plate spring disposed between said bearing unit and said support arm.

36. A disk drive as set forth in claim 31, further comprising a gimbals mechanism disposed to said support arm for supporting said slider freely movably in any of a rolling direction and a pitching direction.

37. A disk drive as set forth in claim 31, wherein a center of gravity of a portion held by said resilient means is located generally in a point of intersection between a rotational axis of said support arm in the radial direction of said recording medium and a rotational axis in the perpendicular direction to said writing surface of said recording medium.

* * * * *